US008267316B2

(12) United States Patent
Ostrowski et al.

(10) Patent No.: US 8,267,316 B2
(45) **Date of Patent: *Sep. 18, 2012**

(54) SYSTEMS AND METHODS FOR MERCHANDISE CHECKOUT

(75) Inventors: Jim Ostrowski, South Pasadena, CA (US); Luis Goncalves, Pasadena, CA (US); Michael Cremean, Los Angeles, CA (US); Alex Simonini, Belmont, CA (US); Alec Hudnut, Los Angeles, CA (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/466,371

(22) Filed: Aug. 22, 2006

(65) Prior Publication Data

US 2006/0283943 A1 Dec. 21, 2006

Related U.S. Application Data

(63) Continuation of application No. 11/023,004, filed on Dec. 27, 2004, now Pat. No. 7,100,824.

(51) Int. Cl.
*G06K 15/00* (2006.01)

(52) U.S. Cl. ........................................ 235/383; 235/454

(58) Field of Classification Search ................... 235/383
See application file for complete search history.

(56) References Cited

U.S. PATENT DOCUMENTS 4,929,819 A * 5/1990 Collins, Jr. .................... 235/383
5,115,888 A 5/1992 Schneider
5,495,097 A 2/1996 Katz et al.
5,543,607 A 8/1996 Watanabe et al.
5,609,223 A 3/1997 Iizaka et al.
5,883,968 A * 3/1999 Welch et al. .................. 382/100
5,967,264 A 10/1999 Lutz et al.
(Continued)

FOREIGN PATENT DOCUMENTS

EP 0672993 A 9/1995
(Continued)

OTHER PUBLICATIONS

Ostrowski , "Systems and Methods for Merchandise Automatic Checkout", U.S. Appl. No. 12/074,283, filed Feb. 29, 2008 (assigned to assignee of the present application).

(Continued)

*Primary Examiner* — Thien M. Le
*Assistant Examiner* — Tae Kim
(74) *Attorney, Agent, or Firm* — Stoel Rives LLP

(57) ABSTRACT

Systems and methods for recognizing and identifying items located on the lower shelf of a shopping cart in a checkout lane of a retail store environment for the purpose of reducing or preventing loss or fraud and increasing the efficiency of a checkout process. The system includes one or more visual sensors that can take images of items and a computer system that receives the images from the one or more visual sensors and automatically identifies the items. The system can be trained to recognize the items using images taken of the items. The system relies on matching visual features from training images to match against features extracted from images taken at the checkout lane. Using the scale-invariant feature transformation (SIFT) method, for example, the system can compare the visual features of the images to the features stored in a database to find one or more matches, where the found one or more matches are used to identify the items.

15 Claims, 7 Drawing Sheets

U.S. PATENT DOCUMENTS

| | | | | |
|---|---|---|---|---|
| 6,069,696 | A | 5/2000 | McQueen et al. | |
| 6,179,206 | B1 | 1/2001 | Matsumori | |
| 6,236,736 | B1 | 5/2001 | Crabtree et al. | |
| 6,332,573 | B1 | 12/2001 | Gu et al. | |
| 6,363,388 | B1 | 3/2002 | Sprenger et al. | |
| 6,550,583 | B1 * | 4/2003 | Brenhouse | 186/66 |
| 6,598,791 | B2 | 7/2003 | Bellis et al. | |
| 6,606,579 | B1 | 8/2003 | Gu | |
| 6,915,008 | B2 | 7/2005 | Barman et al. | |
| 7,044,370 | B2 | 5/2006 | Bellis, Jr. et al. | |
| 7,246,745 | B2 | 7/2007 | Hudnut | |
| 7,337,960 | B2 | 3/2008 | Ostrowski et al. | |
| 7,477,780 | B2 * | 1/2009 | Boncyk et al. | 382/165 |
| 2002/0138374 | A1 * | 9/2002 | Jennings et al. | 705/29 |
| 2003/0184440 | A1 * | 10/2003 | Ballantyne | 340/568.5 |
| 2005/0060324 | A1 | 3/2005 | Johnson et al. | |
| 2005/0173527 | A1 | 8/2005 | Conzola | |
| 2006/0118627 | A1 * | 6/2006 | Joseph et al. | 235/454 |
| 2009/0152348 | A1 | 6/2009 | Ostrowski | |

FOREIGN PATENT DOCUMENTS

| | | | |
|---|---|---|---|
| EP | 0689175 | A | 12/1995 |
| EP | 0843293 | A | 5/1998 |

OTHER PUBLICATIONS

Goncalves , “Self Checkout With Visual Recognition”, U.S. Appl. No. 12/229,069, filed Aug. 18, 2008 (assigned to assignee of the present application).

* cited by examiner

SYSTEMS AND METHODS FOR MERCHANDISE CHECKOUT

CROSS REFERENCE TO RELATED APPLICATIONS

This is a continuation of U.S. patent application Ser. No. 11/023,004 filed on Dec. 27, 2004 which claims priority to U.S. Provisional Patent Application Ser. No. 60/548,565 filed on Feb. 27, 2004, both of which are hereby incorporated herein by reference in their entirety.

BACKGROUND OF THE INVENTION

The present invention generally relates to visual pattern recognition (ViPR) and, more particularly, to systems and methods for automatically recognizing merchandise at retailer checkout station based on ViPR.

In many retail store environments, such as in grocery stores, department stores, office supply stores, home improvement stores, and the like, consumers use shopping carts to carry merchandise. A typical shopping cart includes a basket that is designed for storage of the consumer's merchandise and a shelf located beneath the basket. At times, a consumer will use the lower shelf as additional storage space, especially for relatively large and/or bulky merchandise.

On occasion, when using the lower shelf space to carry merchandise, a consumer can leave the store without paying for the merchandise. This may occur because the consumer inadvertently forgets to present the merchandise to the cashier during checkout, or because the consumer intends to defraud the store and steal the merchandise. Similarly, cashiers are sometimes unable to see the bottom of basket (BoB) merchandise, or fail to look for such merchandise, thereby allowing a customer to leave the store without paying for the BoB items. Further, it is known in the retail industry that cashier can sometimes involved in collusion with customers. This collusion can range from fraudulently allowing a customer to take a BoB item without paying to ringing up a substantially lower price item. Cashier fraud is conventionally estimated to constitute around 35% of total grocery retailer "shrink" according to the national supermarket research group 2003/2004 supermarket shrink survey.

Collectively, this type of loss is known in the retail industry as "bottom-of-the-basket" (BoB) loss. Estimates suggest that a typical supermarket can experience between $3,000 to $5,000 of bottom-of-the-basket revenue losses per lane per year. For a typical modern grocery store with 10 checkout lanes, this loss represents $30,000 to $50,000 of unaccounted revenue per year. For a major grocery chain with 1,000 stores, the potential revenue recovery can reach in excess of $50 million dollars annually.

Several efforts have been undertaken to minimize or reduce bottom-of-the-basket losses. These efforts generally fall into three categories: process change and training; lane configuration change; and supplemental detection devices.

Process change and training is aimed at getting cashier and bagger to inspect the cart for BOB items in every transaction. This approach has not been effective because of high personnel turnover, the requirement of constant training, the low skill level of the personnel, a lack of mechanisms for enforcing the new behavior, and a lack of initiative to encourage tracking and preventing collusion.

Lane configuration change is aimed at making the bottom of the basket more visible to the cashier, either by guiding the cart to a separate side of the lane from the customer (called "lane splitting"), or by using a second cart that requires the customer to fully unload his or her cart and reloading the items onto the second cart (called "cart swapping"). Changing the lane configuration is expensive, does not address the collusion, and is typically a more inconvenient, less efficient way to scan and check out items.

Supplemental devices include mirrors placed on the opposite side of the lane to enable the cashier to see BoB items without leaning over or walking around the lane; infrared sensing devices to alert the cashier that there are BoB items; and video surveillance devices to display an image for the cashier to see the BoB. Infrared detection systems, such as those marketed by Kart Saver, Inc. <URL: http://www.kartsaver.com> and Store-Scan, Inc. <URL: http://www.storescan.com> employ infrared sensors designed to detect the presence of merchandise located on the lower shelf of a shopping cart when the shopping cart enters a checkout lane. Disadvantageously, these systems are only able to detect the presence of an object and are not able to provide any indication as to the identity of the object. Consequently, these systems cannot be integrated with the store's existing checkout subsystems and instead rely on the cashier to recognize the merchandise and input appropriate associated information, such as the identity and price of the merchandise, into the store's checkout subsystem by either bar code scanning or manual key pad entry. As such, alerts and displays for these products can only notify the cashiers of the potential existence of an item, which cashiers can ignore or defeat. Furthermore these systems do not have mechanisms to prevent collusion. In addition, disadvantageously, these infrared systems are relatively more likely to generate false positive indications. For example, these systems are unable to distinguish between merchandise located on the lower shelf of the shopping cart and a customer's bag or other personal items, again causing cashiers to eventually ignore or defeat the system by working around it.

Another supplemental device that attempts to minimize or reduce BoB losses is marketed by VerifEye Technologies <URL: http://www.verifeye.com/products/checkout/checkout.html>. This system employs a video surveillance device mounted in the lane and directed at the bottom of the basket. A small color video display is mounted near the register to aid the cashier in identifying if a BoB item exists. Again, disadvantageously, this system is not integrated with the POS, forcing reliance on the cashier to manually scan or key in the item. Consequently, the system productivity issues are ignored and collusion is not addressed. In one of VerifEye's systems, an option to log image, time and location is available making possible some analysis that could reveal losses or collusion. However, this analysis can only be performed after the fact, and therefore does not prevent a BoB loss.

As can be seen, there is a need for an improved apparatus and method that can view, recognize and automatically checkout items without a cashier's intervention, for example, when those items are located on the lower shelf of a shopping cart in the checkout lane of a retail store environment for the automated detection of merchandise.

SUMMARY OF THE INVENTION

The present invention provides systems and methods through which one or more visual sensors operatively coupled to a computer system can view and recognize items located, for example, on the lower shelf of a shopping cart in the checkout lane of a retail store environment. This may not only reduce or prevent loss or fraud, but also speed the check out process and thus increase the revenue to the store. One or more visual sensors are placed at fixed locations in a checkout register lane such that when a shopping cart moves into the register lane, one or more objects within the field of view of the visual sensor can be recognized and associated with one or more instructions, commands or actions without the need for personnel to visually see the objects, such as by having to come out from behind a check out counter or peering over a check out counter.

In one aspect of the present invention, a system for checking out merchandise includes: at least one visual sensor for capturing an image of an object on a moveable structure; and a subsystem coupled to the at least one visual sensor and configured to detect and recognize the object by analyzing the image.

In another aspect of the present invention, a system for checking out merchandise includes: at least one visual sensor for capturing an image of an object in a moveable structure; a checkout subsystem for receiving visual data from the at least one visual sensor and analyzing the visual data: a server for receiving analyzed visual data from the checkout system, recognizing the object and sending match data to the checkout subsystem; and an Object Database coupled to the server and configured to store one or more objects to recognize.

In still another aspect of the present invention, a system for checking out merchandise includes: at least one visual sensor for capturing an image of an object on a moveable structure; a checkout subsystem; a computer for receiving visual data from the at least one visual sensor, sending match data to the checkout subsystem and receiving transaction data from the checkout subsystem; a server for receiving log data from the checkout subsystem and providing database information to the computer; and an Object Database coupled to the server and configured to store one or more objects to recognize.

In yet another aspect of the present invention, a system for checking out merchandise includes: at least one visual sensor for capturing an image of an object in a shopping cart; a checkout subsystem; a computer for receiving visual data from the at least one visual sensor, sending match data to the checkout subsystem and receiving transaction data from the checkout subsystem; a server for receiving log data from the checkout subsystem and providing database information to the computer; an Object Database coupled to the server and configured to store one or more objects to recognize, the Object Database comprising a Feature Table, and an Object Recognition Table; and a Log Data Storage coupled to the server and configured to store the match data, the Log Data Storage comprising an Output Table.

In another aspect of the present invention, a system for checking out merchandise in a shopping cart includes: a checkout lane; at least one visual sensor for capturing an image of the merchandise; a checkout subsystem for receiving visual data from the at least one visual sensor and analyzing the visual data; a server for receiving analyzed visual data from the checkout system, recognizing the merchandise and sending match data to the checkout subsystem; and an Object Database coupled to the server and configured to store one or more objects to recognize, the Object Database including a Feature Table and an Object Recognition Table.

In another aspect of the present invention, a database includes a Feature Table comprising an object ID field, a view ID field, a feature ID field, a feature coordinates field, an object name field, a view field and a feature descriptor field.

In another aspect of the present invention, a database includes an Output Table comprising an object identification (ID) field, a view ID field, a camera ID field, an image field and a timestamp field.

In another aspect of the present invention, a method of checking out a merchandise includes steps of: receiving visual image data of an object; comparing the visual image data with data stored in a database to find a set of matches; determining if the set of matches is found; and sending a recognition alert.

In another aspect of the present invention, a computer readable medium embodying program code with instructions for recognizing an object includes: program code for receiving a visual image data of the object; program code for comparing the visual image data with data stored in a database to find a set of matches; program code for determining if the set of matches is found; and program code for sending a recognition alert.

In another aspect of the present invention, a method of checking out a merchandise includes steps of: (a) receiving visual image data of an object; (b) comparing the visual image data with data stored in a database to find a set of matches; (c) determining if the set of matches is found; (d) if the set of matches is not found, repeating the steps (a)-(c); (e) checking if each element of the set of matches is reliable; (f) if all elements of the set of matches are unreliable, repeating the steps (a)-(e); and (g) sending match data.

In another aspect of the present invention, a computer readable medium embodying program code with instructions for recognizing an object includes: program code for receiving visual image data of the object; program code for comparing the visual image data with data stored in a database to find a set of matches; program code for determining if the set of matches is found; program code for checking if each element of the set of matches is reliable; program code for sending a recognition alert; and program code for repeating operation of the program code for receiving visual image data to the program code for sending a recognition alert.

In another aspect of the present invention, a method for training a system for recognizing an object includes steps of: receiving a visual image of the object; receiving data associated with the visual image; storing the visual image and the data in a data storage; determining if there is additional image to capture; and running a training subroutine.

In another aspect of the present invention, a computer readable medium embodying program code with instructions for training a system for recognizing an object includes: program code for receiving a visual image of the object; program code for receiving data associated with the visual image; program code for storing the visual image and the data in a data storage; program code for determining if there is additional image to capture; and program code for running a training subroutine.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides systems and methods through which one or more visual sensors, such as one or more cameras, operatively coupled to a computer system can view, recognize and identify items for check out. For example, the items may be checked out for purchase in a store, and as a further example, the items may be located on the lower shelf of a shopping cart in the checkout lane of a store environment. The retail store environment can correspond to any environment in which shopping carts or other similar means of carrying items are used. One or more visual sensors can be placed at locations in a checkout register lane such that when a shopping cart moves into the register lane, a part of the shopping cart, such as the lower shelf, is within the field of view of the visual sensor(s). In contrast to the prior art which merely allows detection, in the present invention, visual features present on one or more objects within the field of view of the visual sensor(s) can be automatically detected as well as recognized, and then associated with one or more instructions, commands, or actions. The present invention can be applied, for example, to a point of sale replacing a conventional UPC barcode and/or manual checkout system with enhanced check out speed. In addition, the present invention may be used to identify various objects on other moving means, such as luggage on a moving conveyor belt.

Figure 1:
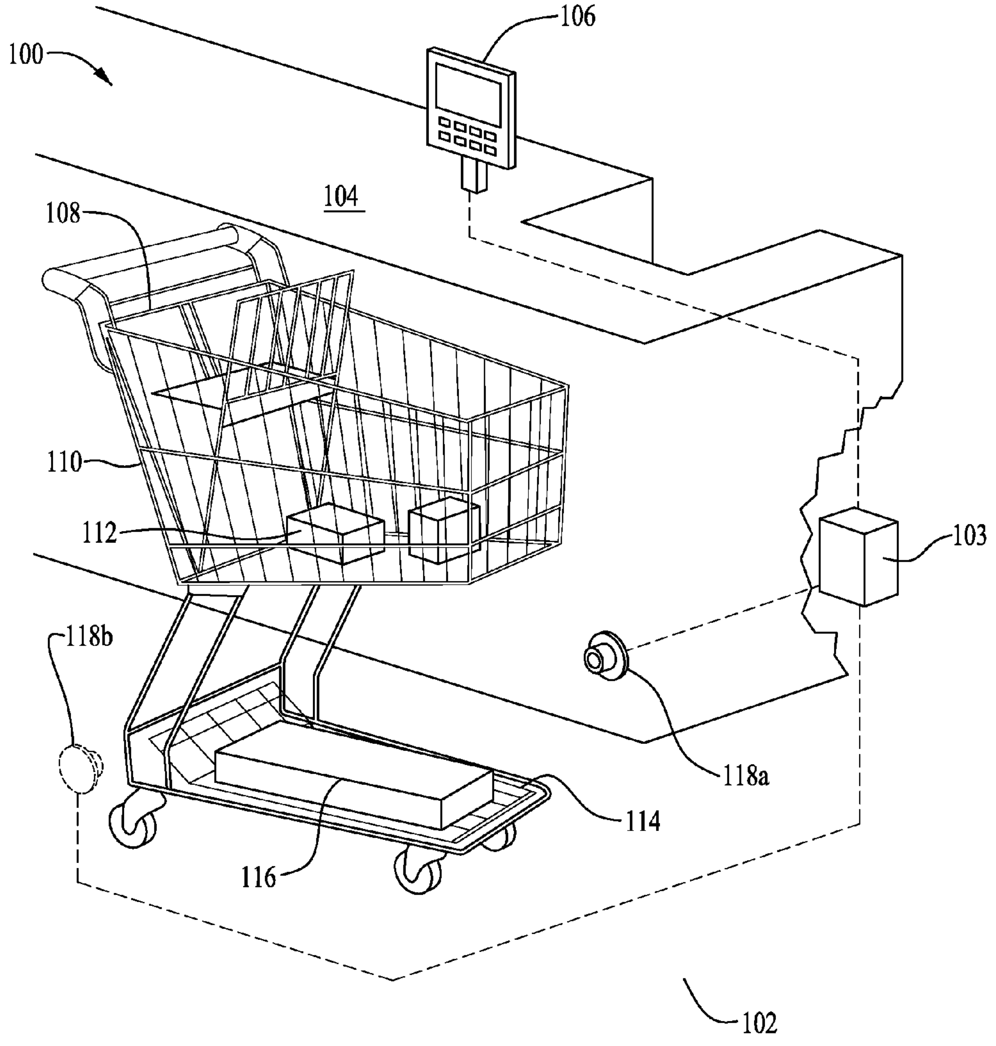
FIG. 1 is a partial cut-away view of a system for merchandise checkout in accordance with one embodiment of the present invention.

FIG. 1 is a partial cut-away view of a system 100 for merchandise checkout in accordance with one embodiment of the present invention. FIG. 1 illustrates an exemplary application of the system 100 that has a capability to recognize and identify objects on a moveable structure. For the purpose of illustration, the system 100 is described as a tool for recognizing items 116 carried on a lower shelf 114 of a shopping cart 108 and preventing bottom-of-the-basket loss only. However, it should be apparent to those of ordinary skill that the system 100 can also be used to recognize and identify objects in various applications based on the same principles as described hereinafter. For example, the system 100 may be used to capture images of items on a moving conveyor belt that may be a part of an automatic checkout system in a retail store environment or an automatic luggage checking system.

As illustrated in FIG. 1, the checkout lane 100 includes an aisle 102 and a checkout counter 104. The system 100 includes a visual sensor 118*a*, a checkout subsystem 106 and a processing unit 103 that may include a computer system and/or databases. In one embodiment, the system 100 may include additional visual sensor 118*b* that may be used at a second location facing the shopping cart 108. Details of the system 100 will be given in following sections in connection with FIGS. 2A-5. For simplicity, only two visual sensors 118*a-b* and one checkout subsystem 106 are shown in FIG. 1. However, it should be apparent to those of ordinary skill that any number of visual sensors and checkout subsystems may be used without deviating from the sprit and scope of the present invention.

A checkout subsystem 106, such as a cash register or a point of sale (POS) subsystem, may rest on the checkout counter 104 and include one or more input devices. Exemplary input devices may include a barcode scanner, a scale, a keyboard, keypad, touch screen, card reader, and the like. In one embodiment, the checkout subsystem 106 may correspond to a checkout terminal used by a checker or cashier. In another embodiment, the checkout subsystem 106 may correspond to a self-service checkout terminal.

As illustrated in FIG. 1, the visual sensor 118*a* may be affixed to the checkout counter 104, but it will be understood that in other embodiments, the visual sensor 118*a* may be integrated with the checkout counter 104, may be floor mounted, may be mounted in a separate housing, and the like. Each of the visual sensors 118*a-b* may be a digital camera with a CCD imager, a CMOS imager, an infrared imager, and the like. The visual sensors 118*a-b* may include normal lenses or special lenses, such as wide-angle lenses, fish-eye lenses, omni-directional lenses, and the like. Further, the lens may include reflective surfaces, such as planar, parabolic, or conical mirrors, which may be used to provide a relatively large field of view or multiple viewpoints.

During checkout, a shopping cart 108 may occupy the aisle 102. The shopping cart 108 may include a basket 110 and a lower shelf 114. One or more items 112 may be carried in the basket 110, and one or more items 116 may be carried on the lower shelf 114. In one embodiment, the visual sensors 118*a-b* may be located such that the item 116 may be at least partially within the field of view of the visual sensors 118*a-b*. As will be described in greater detail later in connection with FIG. 4, the visual sensors 118*a-b* may be used to recognize the presence and identity of the items 116 and provide an indication or instruction to the checkout subsystem 106. In another embodiment, the visual sensors 118*a-b* may be located such that the items 112 in the basket 110 may be checked out using the system 100.

Figure 2A:
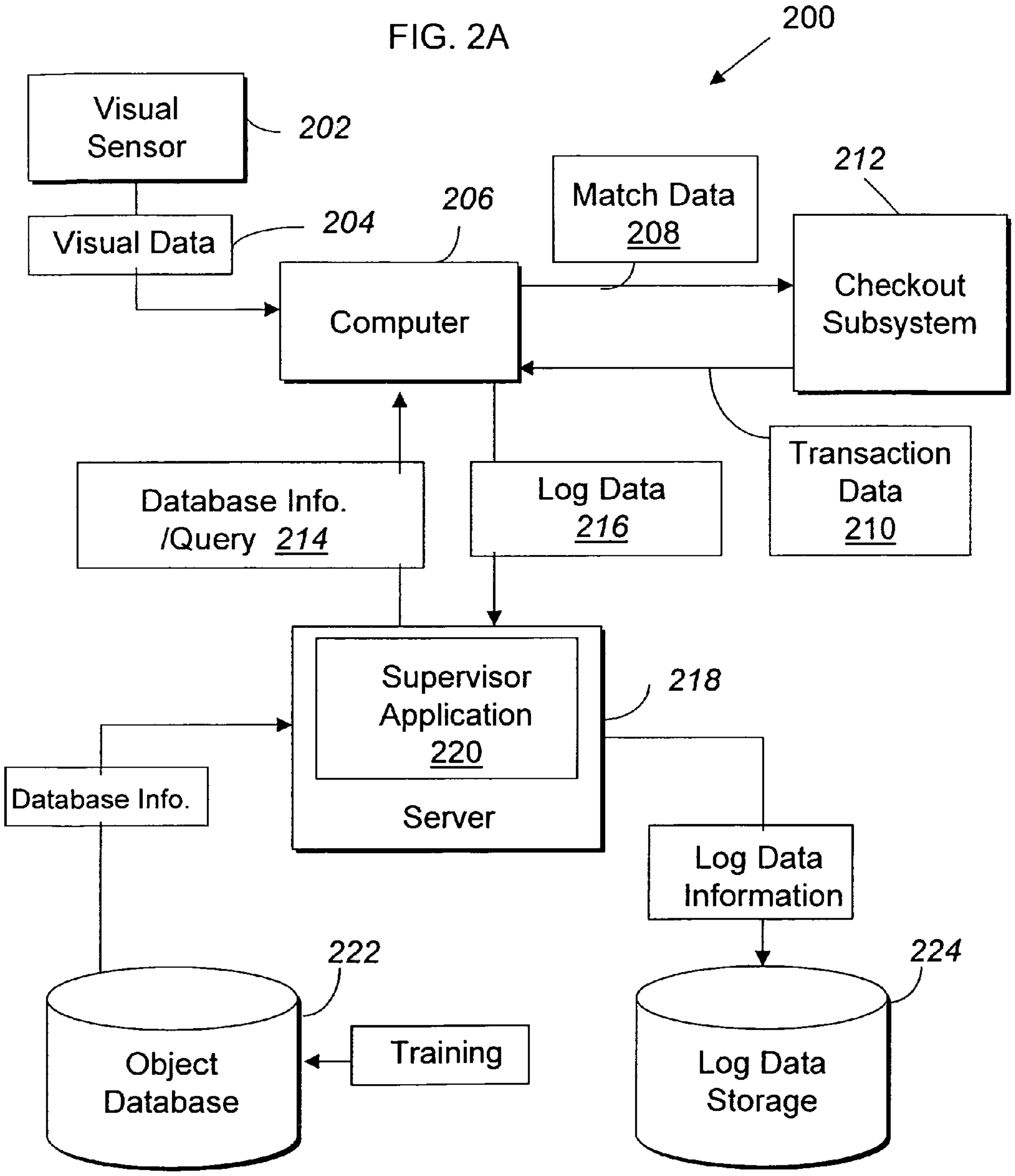
FIG. 2A is a schematic diagram of one embodiment of the system for merchandise checkout in FIG. 1.

FIG. 2A is a schematic diagram of one embodiment 200 of the system for merchandise checkout in FIG. 1. It will be understood that the system 200 may be implemented in a variety of ways, such as by dedicated hardware, by software executed by a microprocessor, by firmware and/or computer readable medium executed by a microprocessor or by a combination of both dedicated hardware and software. Also, for simplicity, only one visual sensor 202 and one checkout subsystem 206 are shown in FIG. 2A. However, it should be apparent to those of ordinary skill that any number of visual sensors and checkout subsystems may be used without deviating from the sprit and scope of the present invention.

The visual sensor 202 may continuously capture images at a predetermined rate and compare two consecutive images to detect motion of an object that is at least partially within the field of view of the visual sensor 202. Thus, when a customer carries one or more items 116 on, for example, the lower shelf 114 of the shopping cart 108 and moves into the checkout lane 100, the visual sensor 202 may recognize the presence of the items 116 and send visual data 204 to the computer 206 that may process the visual data 204. In one embodiment, the visual data 204 may include the visual images of the one or more items 116. In another embodiment, an IR detector may be used to detect motion of an object.

It will be understood that the visual sensor 202 may communicate with the computer 206 via an appropriate interface, such as a direct connection or a networked connection. This interface may be hard wired or wireless. Examples of interface standards that may be used include, but are not limited to, Ethernet, IEEE 802.11, Bluetooth, Universal Serial Bus, FireWire, S-Video, NTSC composite, frame grabber, and the like.

The computer 206 may analyze the visual data 204 provided by the visual sensor 202 and identify visual features of the visual data 204. In one example, the features may be identified using an object recognition process that can identify visual features of an image. In another embodiment, the visual features may correspond to scale-invariant features. The concept of scale-invariant feature transformation (SIFT) has been extensively described by David G. Lowe, "Object Recognition from Local Scale-Invariant Features," Proceedings of the International Conference on Computer Vision, Corfu, Greece, September, 1999 and by David G. Lowe, "Local Feature View Clustering for 3D Object Recognition," Proceedings of the IEEE Conference on Computer Vision and Pattern Recognition, Kauai, Hi., December, 2001; both of which are incorporated herein by reference.

It is noted that the present invention teaches an object recognition process that comprises two steps; (1) feature extraction and (2) recognize the object using the extracted features. However, It is not necessary to extract the features to recognize the object.

The computer 206 may be a PC, a server computer, or the like, and may be equipped with a network communication device such as a network interface card, a modem, infra-red (IR) port, or other network connection device suitable for connecting to a network. The computer 206 may be connected to a network such as a local area network or a wide area network, such that information, including information about merchandise sold by the store, may be accessed from the computer 206. The information may be stored on a central computer system, such as a network fileserver, a mainframe, a secure Internet site, and the like. Furthermore, the computer 206 may execute an appropriate operating system. The appropriate operating system may include, but is not limited to, operating systems such as Linux, Unix, VxWorks®, QNX® Neutrino®, Microsoft® Windows® 3.1, Microsoft® Windows® 95, Microsoft® Windows® 98, Microsoft® Windows® NT, Microsoft® Windows® 2000, Microsoft® Windows® Me, Microsoft® Windows® XP, Apple® MacOS®, IBM OS/2®, Microsoft® Windows® CE, or Palm OS®. As is conventional, the appropriate operating system may advantageously include a communications protocol implementation that handles incoming and outgoing message traffic passed over the network.

The computer 206 may be connected to a server 218 that may provide the database information 214 stored in an Object Database 222 and/or a Log Data Storage 224. The server 218 may send a query to the computer 206. A query is an interrogating process initiated by the Supervisor Application 220 residing in the server 218 to acquire Log Data from the computer 206 regarding the status of the computer 206, transactional information, cashier identification, time stamp of a transaction and the like. The computer 206, after receiving a query 214 from the server 218, may retrieve information from the log data 216 to pass on relevant information back to the server 218, thereby answering the interrogation. A Supervisor Application 220 in the server 218 may control the flow of information therethrough and manage the Object Database 222 and Log Data Storage 224. When the system 200 operates in a "training" mode, the server 218 may store all or at least part of the analyzed visual data, such as features descriptors and coordinates associated with the identified features, along with other relevant information in the Object Database 222. The Object Database 222 will be discussed in greater detail later in connection with FIG. 3.

It will be understood that during system training, it may be convenient to use a visual sensor that is not connected to a checkout subsystem and positioned near the floor. For example, training images may be captured in a photography studio or on a "workbench," which can result in higher-quality training images and less physical strain on a human system trainer. Further, it will be understood that during system training, the computer 206 may not need to output match data 208. In one embodiment, the features of the training images may be captured and stored in the Object Database 222.

When the system 200 operates in an "operation" mode, the computer 206 may compare the visual features with the database information 214 that may include a plurality of known objects stored in the Object Database 222. If the computer 206 finds a match in the database information 214, it may return match data 208 to the checkout subsystem 206. Examples of appropriate match data will be discussed in greater detail later in connection with FIG. 3. The server 218 may provide the computer 206 with an updated, or synchronized copy of the Object Database 222 at regular intervals, such as once per hour or once per day, or when an update is requested by the computer 206 or triggered by a human user.

When the computer 206 cannot find a match, it may send a signal to the checkout subsystem 212 that may subsequently display a query on a monitor and request the operator of the checkout subsystem 212 to take an appropriate action, such as identifying the item 116 associated with the query and providing the information of the item 116 using an input device connected to the checkout subsystem 212.

In the operational mode, the checkout subsystem 212 may provide transaction data 210 to the computer 206. Subsequently, the computer 206 may send log data 216 to the server 218 that may store the data in the Object Database 222, wherein the log data 216 may include data for one or more transactions. In one embodiment, the computer 206 may store the transaction data 210 locally and provide the server 218 with the stored transaction data for storage in the Object Database 222 at regular intervals, such as once per hour or once per day.

The server 218, Object Database 222 and Log Data Storage 224 may be connected to a network such as a local area network or a wide area network, such that information, including information from the Object Database 222 and the Log Data Storage 224, can be accessed remotely. Furthermore, the server 208 may execute an appropriate operating system. The appropriate operating system may include but is not limited to operating systems such as Linux, Unix, Microsoft® Windows® 3.1, Microsoft® Windows® 95, Microsoft® Windows® 98, Microsoft® Windows® NT, Microsoft® Windows® 2000, Microsoft® Windows® Me, Microsoft® Windows® XP, Apple® MacOS®, or IBM OS/2®. As is conventional, the appropriate operating system may advantageously include a communications protocol implementation that handles incoming and outgoing message traffic passed over the network.

When the checkout subsystem 212 receives the match data 208 from the computer 206, the checkout subsystem 212 may take one or more of a wide variety of actions. In one embodiment, the checkout subsystem 212 may provide a visual and/or audible indication that a match has been found for the operator of the checkout subsystem 212. In one example, the indication may include the name of the object. In another embodiment, the checkout subsystem 212 may automatically add the item or object associated with the identified match to a list or table of items for purchase without any action required from the operator of the checkout subsystem 212. It will be understood that the list or table may be maintained in the checkout system 212 memory. In one embodiment, when the entry of merchandise or items or purchase is complete, a receipt of the items and their corresponding prices may be generated at least partly from the list or table. The checkout system 212 may also store an electronic log of the item, with a designation that it was sent by the computer 206.

Figure 2B:
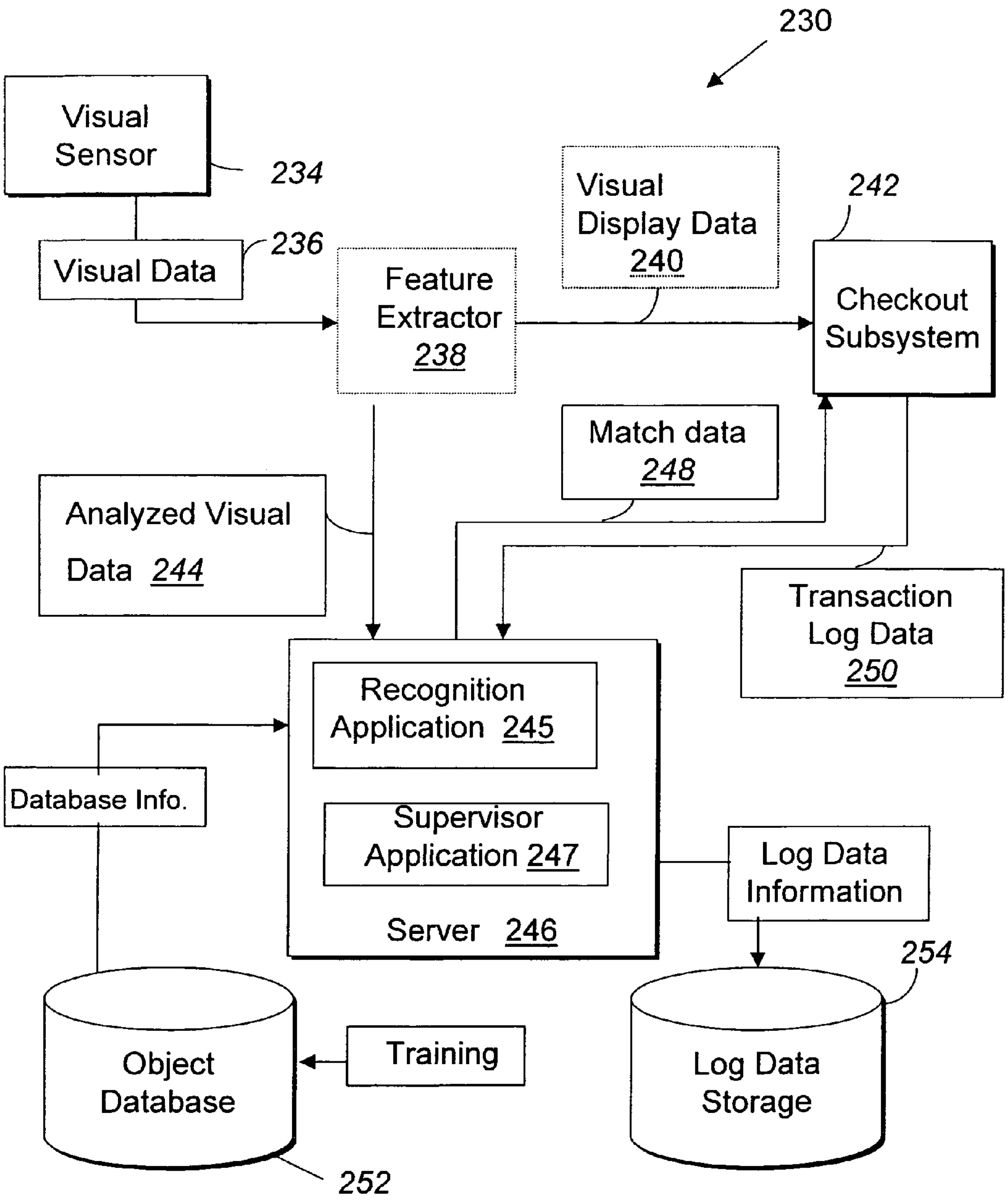
FIG. 2B is a schematic diagram of another embodiment of the system for merchandise checkout in FIG. 1.

FIG. 2B is a schematic diagram of another embodiment 230 of the system for merchandise checkout in FIG. 1. It will be understood that the system 230 may be similar to the system 200 in FIG. 2A with some differences. Firstly, the system 230 may optionally include a feature extractor 238 for analyzing visual data 236 sent by a visual sensor 234 to extract features. The feature extractor 238 may be dedicated hardware. The feature extractor 238 may also send visual display data 240 to a checkout subsystem 242 that may include a display monitor for displaying the visual display data 240. Secondly, in the system 200, the computer 206 may analyze the visual data 204 to extract features, recognize the items associated with the visual data 204 using the extracted features and send the match data 208 to the checkout subsystem 212. In contrast, in the system 230, the feature extractor 238 may analyze the visual data 236 to extract features and send the analyzed visual data 244 to the server 246 that may subsequently recognize the items. As a consequence, the server 246 may send the match data 248 to the checkout subsystem 242. Thirdly, in the system 200, the checkout subsystem 212 may send transaction log data to the server 218 via the computer 206, while, in the system 230, the checkout subsystem 242 may send the transaction log data 250 to the server 246 directly. It is noted that both systems 200 and 230 may use the same object recognition technique, such as SIFT method, even though different components may perform the process of analysis and recognition. Fourthly, the server 246 may include a recognition application 245.

It is noted that the system 230 may operate without the visual display data 240. In an alternative embodiment of the system 230, the visual display data 240 may be included in the match data 248.

It will be understood that the components of the system 230 may communicate with one another via connection mechanisms similar to those of the system 200. For example, the visual sensor 234 may communicate with the server 246 via an appropriate interface, such as a direct connection or a networked connection, wherein examples of interface standards may include, but are not limited to, Ethernet, IEEE 802.11, Bluetooth, Universal Serial Bus, FireWire, S-Video, NTSC composite, frame grabber, and the like. Likewise, the Object Database 252 and the Log Data Storage 254 may be similar to their counterparts of FIG. 2A.

The server 246 may execute an appropriate operating system. The appropriate operating system may include but is not limited to operating systems such as Linux, Unix, Microsoft® Windows® 3.1, Microsoft® Windows® 95, Microsoft® Windows® 98, Microsoft® Windows® NT, Microsoft® Windows® 2000, Microsoft® Windows® Me, Microsoft® Windows® XP, Apple® MacOS®, or IBM OS/2®. As is conventional, the appropriate operating system may advantageously include a communications protocol implementation that handles incoming and outgoing message traffic passed over the network.

The system 230 may operate in an operation mode and a training mode. In the operation mode, when the checkout subsystem 242 receives match data 248 from the server 246, the checkout subsystem 242 may take actions similar to those performed by the checkout subsystem 212. In the operational mode, the checkout subsystem 242 may provide transaction log data 250 to the server 246. Subsequently, the server 246 may store the data in the Object Database 252. In one embodiment, the checkout subsystem 242 may store the match data 248 locally and provide the server 246 with the match data for storage in the Object Database 252 at regular intervals, such as once per hour or once per day.

Figure 2C:
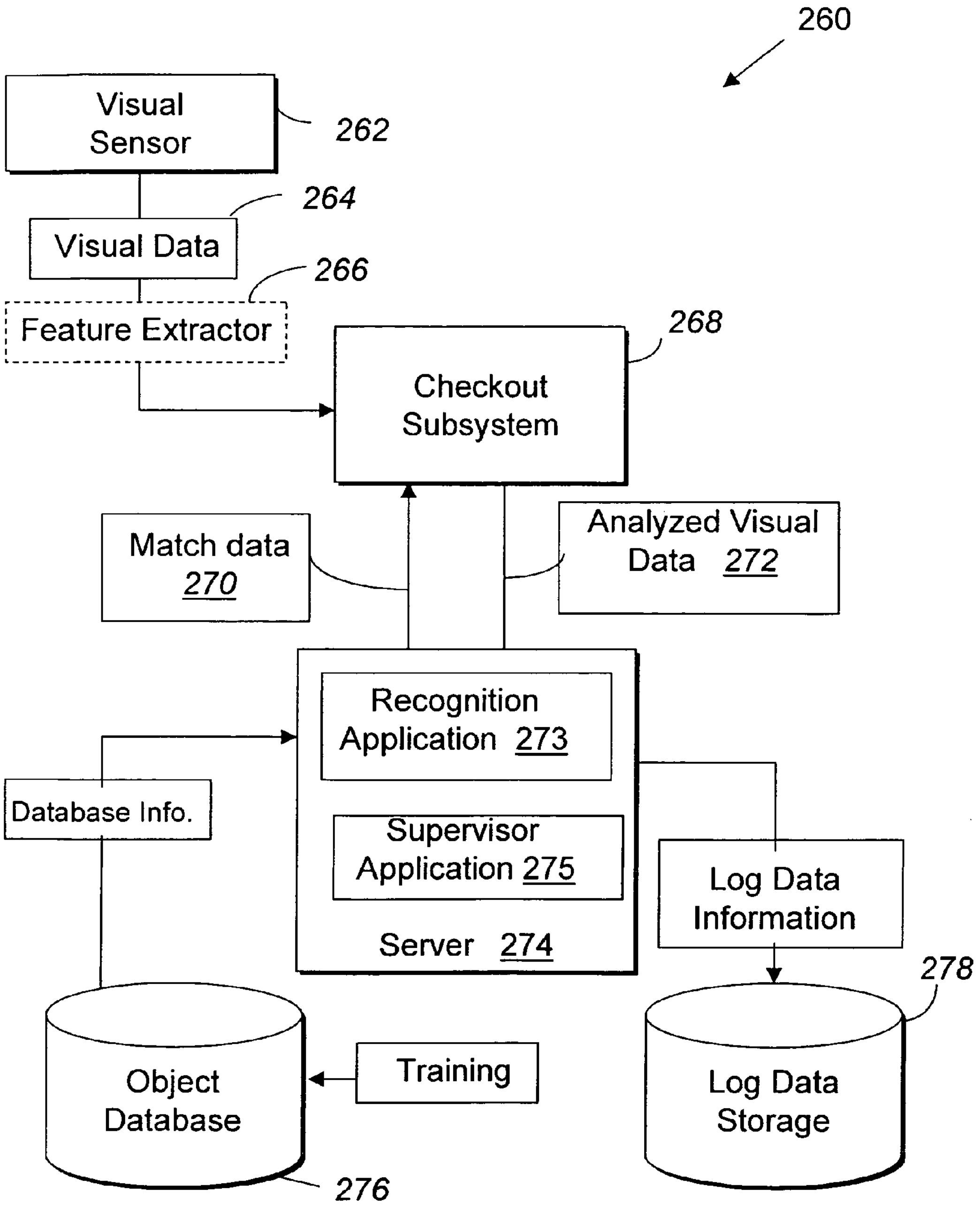
FIG. 2C is a schematic diagram of yet another embodiment of the system for merchandise checkout in FIG. 1.

FIG. 2C is a schematic diagram of another embodiment 260 of the system for merchandise checkout in FIG. 1. The system 260 may be similar to the system 230 in FIG. 2B with a difference that the functionality of the feature extractor 238 may be implemented in a checkout subsystem 268. As illustrated in FIG. 2C, a visual sensor 262 may send visual data 264 to a checkout subsystem 268 that may analyze the data to generate analyzed visual data 272. In an alternative embodiment, the visual data 264 may be provided as an input to a server 274 via the checkout subsystem 268 if the server 274 has the capability to analyze the input and recognize the item associated with the input. In this alternative embodiment, the server 274 may receive the unmodified visual data 264 via the checkout subsystem 268, and perform the analysis and feature extraction of the unmodified visual data 264.

Optionally, a feature extractor 266 may be used to extract features and generate analyzed visual data. The visual extractor 266 may be implemented within a visual sensor unit as shown in FIG. 2B or may be separate from the visual sensor. In this case, the checkout subsystem 268 may simply pass the analyzed visual data 272 to the server 274.

The system 260 may operate in an operation mode and a training mode. In the operation mode, the checkout subsystem 268 may store a local copy of the Object Database 276, which advantageously may allow the matching process to occur relatively quickly. In the training mode, the server 274 may provide the checkout subsystem 268 with an updated, or synchronized copy of the Object Database 276 at regular intervals, such as once per hour or once per day, or when an update is requested by the checkout subsystem 268.

When the system 260 operates in the operation mode, the server 274 may send the match data 270 to the checkout subsystem 268. Subsequently, the checkout subsystem 268 may take actions similar to those performed by the checkout subsystem 242. The server 274 may also provide the match data to a Log Data Storage 278. It will be understood that the match data provided to the Log Data Storage 278 can be the same as or can differ from the match data 270 provided to the checkout subsystem 268. In one embodiment, the match data provided to the Log Data Storage 278 may include an associated timestamp, but the match data 270 provided to the checkout subsystem 268 may not include a timestamp. The Log Data Storage 278, as well as examples of appropriate match data provided for the Log Data Storage 278, will be discussed in greater detail later in connection with FIG. 3. In an alternative embodiment, the checkout subsystem 268 may store match data locally and provide the server 274 with the match data for storage in the Log Data Storage 278 at regular intervals, such as once per hour or once per day.

It will be understood that the component of the system 260 may communicate with one another via connection mechanisms similar to those of the system 230. Also, it is noted that the Object Database 276 and Log Data Storage 278 may be similar to their counterparts of FIG. 2B and explained in the following sections in connection with FIG. 3.

Optionally, the server 274 can reside inside the checkout subsystem 268 using the same processing and memory power in the checkout subsystem 268 to run both the supervisor application 275 and recognition application 273.

Figure 3:
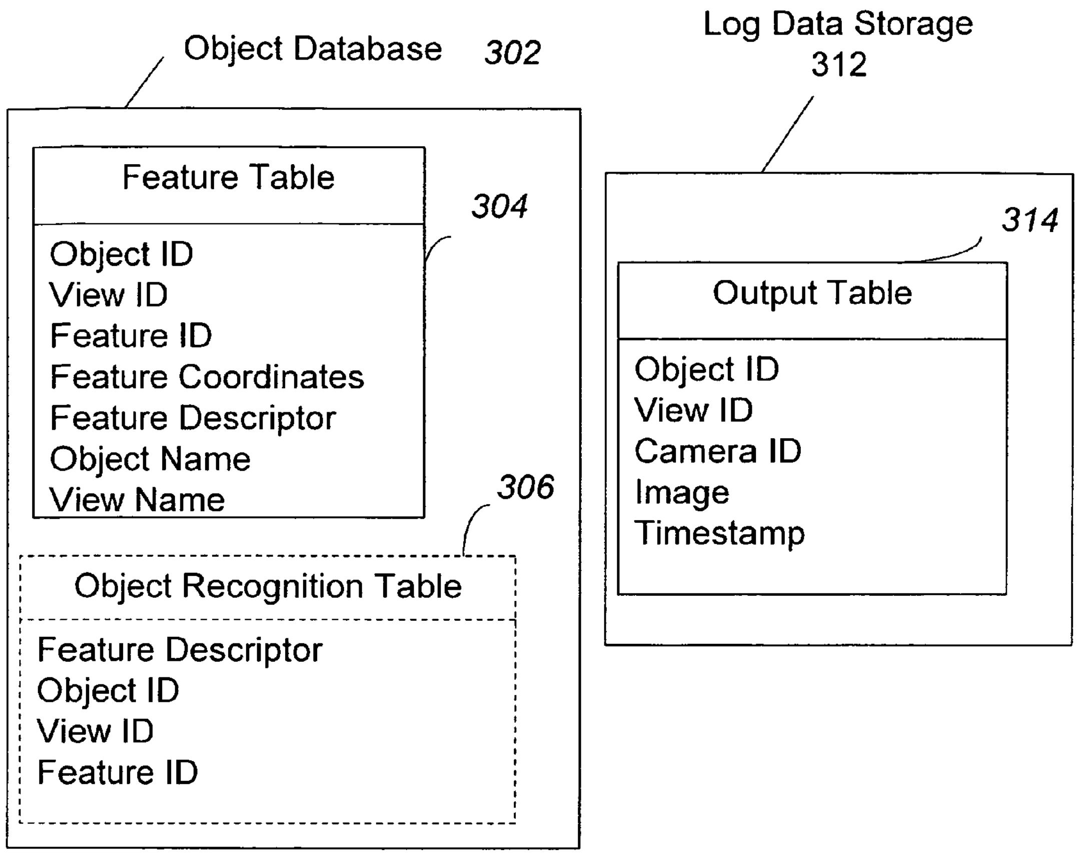
FIG. 3 is a schematic diagram of an Object Database and Log Data Storage illustrating an example of a relational database structure in accordance with one embodiment of the present invention.

FIG. 3 is a schematic diagram of an Object Database 302 and Log Data Storage 312 (or, equivalently, log data storage database) illustrating an example of a relational database structure in accordance with one embodiment of the present invention. It will be understood by one of ordinary skill in the art that a database may be implemented on an addressable storage medium and may be implemented using a variety of different types of addressable storage mediums. For example, the Object Database 302 and/or the Log Data Storage 312 may be entirely contained in a single device or may be spread over several devices, computers, or servers in a network. The Object Database 302 and/or the Log Data Storage 312 may be implemented in such devices as memory chips, hard drives, optical drives, and the like. Though the databases 302 and 312 have the form of a relational database, one of ordinary skill in the art will recognize that each of the databases may also be, by way of example, an object-oriented database, a hierarchical database, a lightweight directory access protocol (LDAP) directory, an object-oriented-relational database, and the like. The databases may conform to any database standard, or may even conform to a non-standard private specification. The databases 302 and 312 may also be implemented utilizing any number of commercially available database products, such as, by way of example, Oracle® from Oracle Corporation, SQL Server and Access from Microsoft Corporation, Sybase® from Sybase, Incorporated, and the like.

The databases 302 and 312 may utilize a relational database management system (RDBMS). In a RDBMS, the data may be stored in the form of tables. Conceptually, data within the table may be stored within fields, which may be arranged into columns and rows. Each field may contain one item of information. Each column within a table may be identified by its column name one type of information, such as a value for a SIFT feature descriptor. For clarity, column names may be illustrated in the tables of FIG. 3.

A record, also known as a tuple, may contain a collection of fields constituting a complete set of information. In one embodiment, the ordering of rows may not matter, as the desired row may be identified by examination of the contents of the fields in at least one of the columns or by a combination of fields. Typically, a field with a unique identifier, such as an integer, may be used to identify a related collection of fields conveniently.

As illustrated in FIG. 3, by way of example, two tables 304 and 306 may be included in the Object Database 302, and one table 314 may be included in the Log Data Storage 312. The exemplary data structures represented by the five tables in FIG. 3 illustrate a convenient way to maintain data such that an embodiment using the data structures can efficiently store and retrieve the data therein. The tables for the Object Database 302 may include a Feature Table 304, and an optional Object Recognition Table 306.

The Feature Table 304 may store data relating to the identification of an object and a view. For example, a view can be characterized by a plurality of features. The Feature Table 304 may include fields for an Object ID, a View ID, a Feature ID for each feature stored, a Feature Coordinates for each feature stored, and a Feature Descriptor associated with each feature stored, view name field, an object name field. The Object ID field and the View ID field may be used to identify the records that correspond to a particular view of a particular object. A view of an object may be typically characterized by a plurality of features. Accordingly, the Feature ID field may be used to identify records that correspond to a particular feature of a view. The View ID field for a record may be used to identify the particular view corresponding to the feature and may be used to identify related records for other features of the view. The Object ID field for a record may used to identify the particular object corresponding to the feature and may be used to identify related records for other views of the object and/or other features associated with the object. The Feature Descriptor field may be used to store visual information about the feature such that the feature may be readily identified when the visual sensor observes the view or object again. The Feature Coordinate field may be used to store the coordinates of the feature. This may provide a reference for calculations that depend at least in part on the spatial relationships between multiple features. An Object Name field may be used to store the name of the object and may be used to store the price of the object. The Feature Table 308 may, optionally, store additional information associated with the object. The View Name field may be used to store the name of the view. For example, it may be convenient to construct a view name by appending a spatial designation to the corresponding object name. As an illustration, if an object name is "Cola 24-Pack," and the object is packaged in the shape of a box, it may be convenient to name the associated views "Cola 24-Pack Top View," "Cola 24-Pack Bottom View," "Cola 24-Pack Front View," "Cola 24-Pack Back View," "Cola 24-Pack Left View," and "Cola 24-Pack Right View."

The optional Object Recognition Table 306 may include the Feature Descriptor field, the Object ID field (such as a Universal Product Code), the View ID field, and the Feature ID field. The optional Object Recognition Table 306 may advantageously be indexed by the Feature Descriptor, which may facilitate the matching of observed images to views and/or objects.

The illustrated Log Data Storage 312 includes an Output Table 314. The Output Table 314 may include fields for an Object ID, a View ID, a Camera ID, a Timestamp, and an Image. The system may append records to the Output Table 314 as it recognizes objects during operation. This may advantageously provide a system administrator with the ability to track, log, and report the objects recognized by the system. In one embodiment, when the Output Table 314 receives inputs from multiple visual sensors, the Camera ID field for a record may be used to identify the particular visual sensor associated with the record. The Image field for a record may be used to store the image associated with the record.

Figure 4:
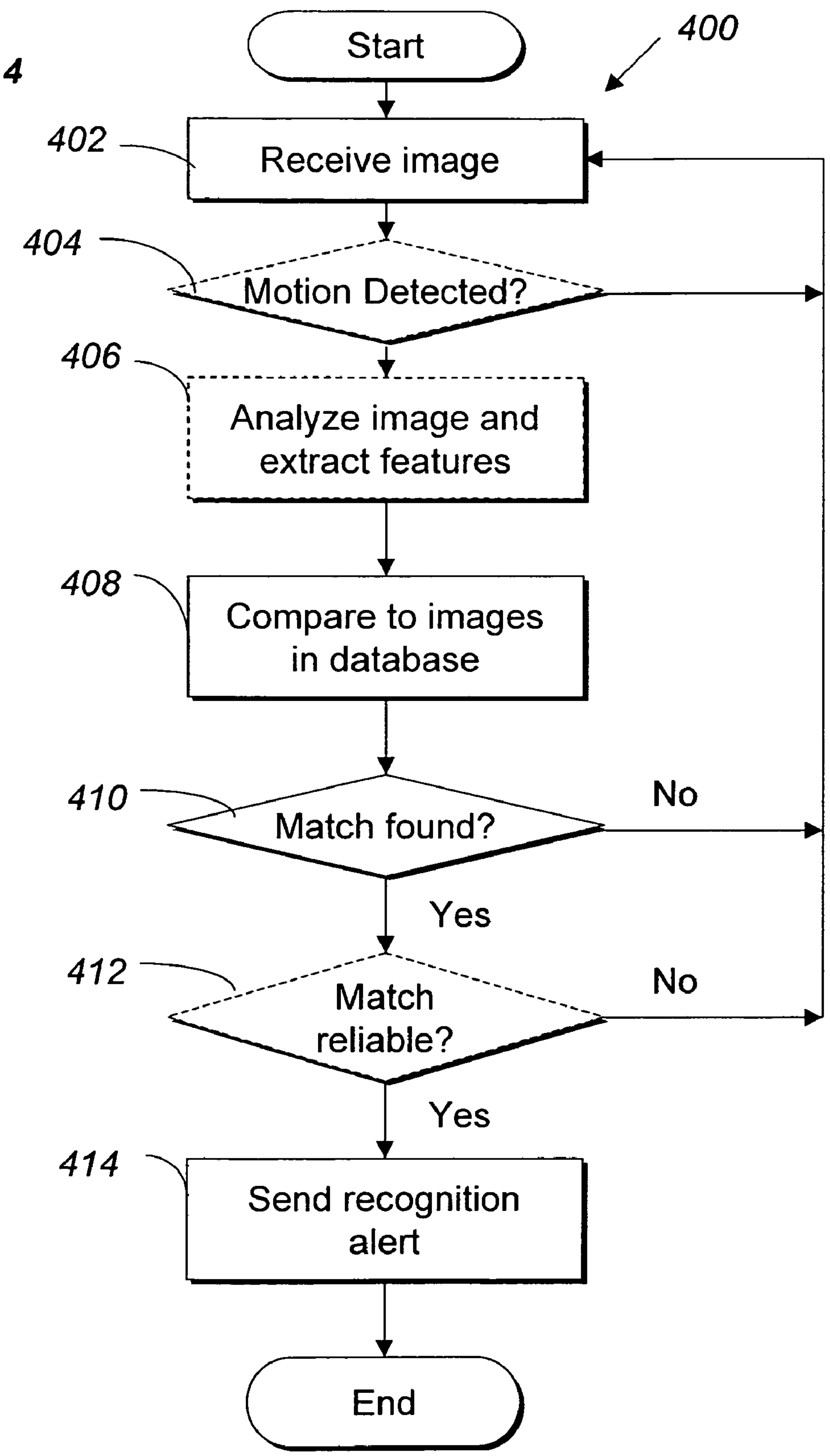
FIG. 4 is a flowchart that illustrates a process for recognizing and identifying objects in accordance with one embodiment of the present invention.

FIG. 4 is a flowchart 400 that illustrates a process for recognizing and identifying objects in accordance with one embodiment of the present invention. It will be appreciated by those of the ordinary skill that the illustrated process may be modified in a variety of ways without departing from the spirit and scope of the present invention. For example, in another embodiment, various portions of the illustrated process may be combined, be rearranged in an alternate sequence, be removed, and the like. In addition, it should be noted that the process may be performed in a variety of ways, such as by software executing in a general-purpose computer, by firmware and/or computer readable medium executed by a microprocessor, by dedicated hardware, and the like.

At the start of the process illustrated in FIG. 4, the system 100 has already been trained or programmed to recognize selected objects.

The process may begin in a state 402. In the state 402, a visual sensor, such as a camera, may capture an image of an object to make visual data. In one embodiment, the visual sensor may continuously capture images at a predetermined rate. The process may advance from the state 402 to a state 404.

In the state 404, which is an optional step, two or more consecutive images may be compared to determine if motion of an item has been detected. If motion is detected, the process may proceed to another optional step 406. Otherwise, the visual sensor may capture more images. Motion detection is an optional feature of the system. It is used to limit the amount of computation. If the computer is fast enough, this may not be necessary at all.

In the optional state 406, the process may analyze the visual data acquired in the state 404 to extract visual features. As mentioned above, the process of analyzing the visual data may be performed by a computer 206, a feature extractor 238, a checkout system 268 or a server 274 (shown in FIGS. 2A-C). A variety of visual recognition techniques may be used, and it will be understood by one of ordinary skill in the art that an appropriate visual recognition technique may depend on a variety of factors, such as the visual sensor used and/or the visual features used. In one embodiment, the visual features may be identified using an object recognition process that can identify visual features. In one example, the visual features may correspond to SIFT features. Next, the process may advance from the state 406 to a state 408.

In the state 408, the identified visual features may be compared to visual features stored in a database, such as an Object Database 222. In one embodiment, the comparison may be done using the SIFT method described earlier. The process may find one match, may find multiple matches, or may find no matches. In one embodiment, if the process finds multiple matches, it may, based on one or more measures of the quality of the matches, designate one match, such as the match with the highest value of an associated quality measure, as the best match. Optionally, a match confidence may be associated with a match, wherein the confidence is a variable that is set by adjusting a parameter with a range, such as 0% to 100%, that relates to the fraction of the features that are recognized as matching between the visual data and a particular stored image, or stored set of features. If the match confidence does not exceed a pre-determined threshold, such as a 90% confidence level, the match may not be used. In one embodiment, if the process finds multiple matches with match confidence that exceed the pre-determined threshold, the process may return all such matches. The process may advance from the state 408 to a decision block 410.

In the decision block 410, a determination may be made as to whether the process found a match in the state 408. If the process does not identify a match in the state 408, the process may return to the state 402 to acquire another image. If the process identifies a match in the state 408, the process may proceed to an optional decision block 412.

In the optional decision block 412, a determination may be made as to whether the match found in the state 408 is considered reliable. In one embodiment, when a match is found, the system 100 may optionally wait for one or more extra cycles to compare the matched object from these extra cycles, so that the system 100 can more reliably determine the true object. In one implementation, the system 100 may verify that the matched object is identically recognized for two or more cycles before determining a reliable match. Another implementation may compute the statistical probability that each object that can be recognized is present over several cycles. In another embodiment, a match may be considered reliable if the value of the associated quality measure or associated confidence exceeds a predetermined threshold. In another embodiment, a match may be considered reliable if the number of identified features exceeds a predetermined threshold. In another embodiment, a secondary process, such as matching against a smaller database, may be used to compare this match to any others present. In yet another embodiment, the optional decision block 412 may not be used, and the match may always be considered reliable.

If the optional decision block 412 determines that the match is not considered reliable, the process may return to the state 402 to acquire another image. If the process determines that the match is considered reliable, the process may proceed to a state 414.

In the state 414, the process may send a recognition alert, where the recognition alert may be followed by one or more actions. Exemplary action may be displaying item information on a display monitor of a checkout subsystem, adding the item to a shopping list, sending match data to a checkout subsystem, storing match data into Log Data Storage, or the actions described in connection with FIGS. 1 and 2.

Figure 5:
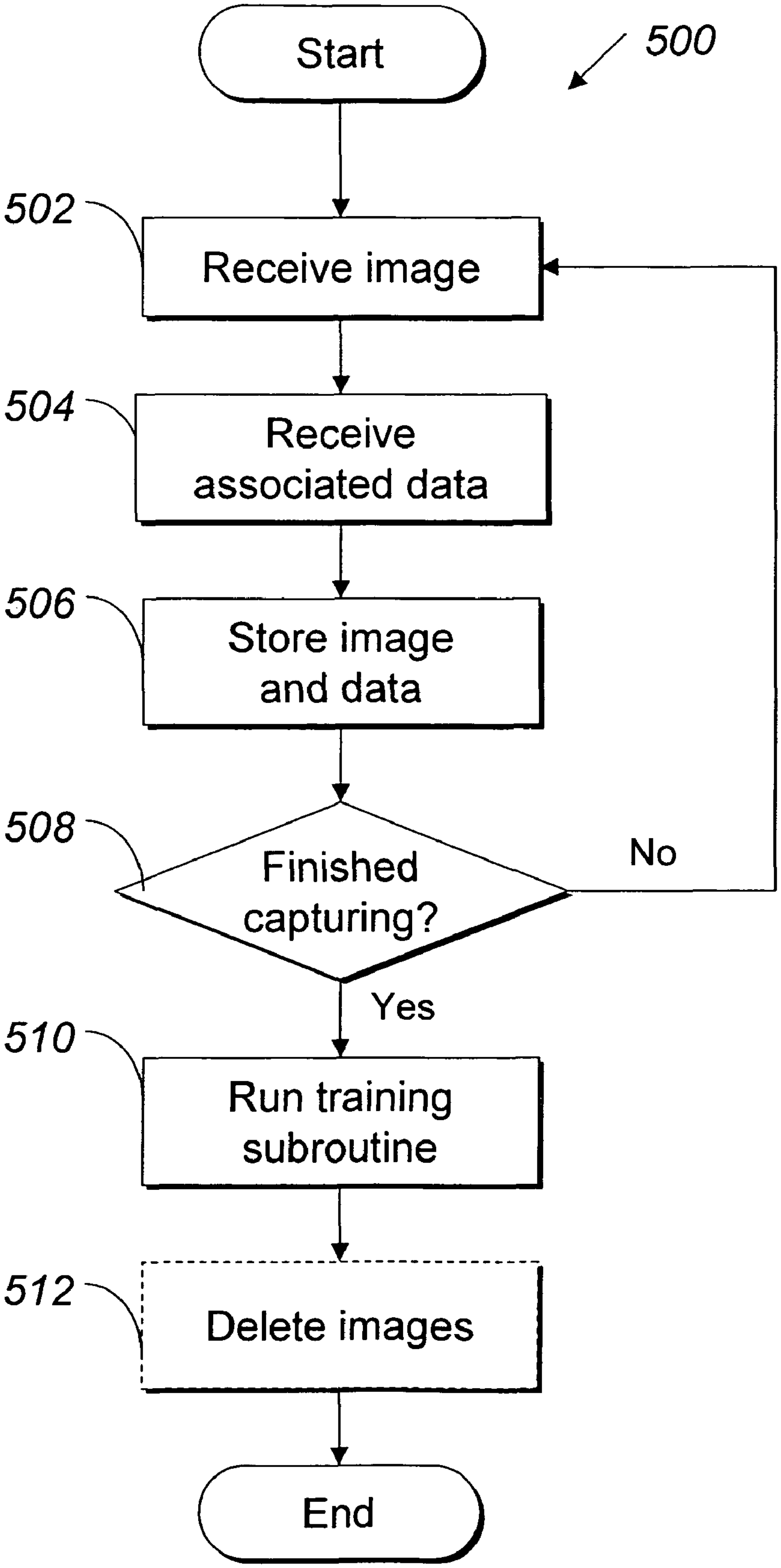
FIG. 5 is a flowchart that illustrates a process for training the system for merchandise checkout in FIG. 1 in accordance with one embodiment of the present invention.

FIG. 5 is a flowchart 500 that illustrates a process for training the system 100 in accordance with one embodiment of the present invention. It will be appreciated by those of ordinary skill that the illustrated process may be modified in a variety of ways without departing from the spirit and scope of the present invention. For example, in another embodiment, various portions of the illustrated process may be combined, be rearranged in an alternate sequence, be removed, and the like. In addition, it should be noted that the process may be performed in a variety of ways, such as by software executing in a general-purpose computer, by firmware and/or computer readable medium executed by a microprocessor, by dedicated hardware, and the like.

The process may begin in a state 502. In the state 502, the process may receive visual data of an item from a visual sensor, such as a camera. As described earlier, it may be convenient, during system training, to use a visual sensor that is not connected to a checkout subsystem positioned near the floor. For example, training images may be captured in a photography studio or on a "workbench," which may result in higher-quality training images and less physical strain on a human system trainer. The process may advance from the state 502 to a state 504. In one embodiment, the system may receive electronic data from the manufacturer of the item, where the electronic data may include information associated with the item, such as merchandise specifications and visual images.

In the state 504, the process may receive data associated with the image received in the state 502. Data associated with an image may include, for example, the distance between the visual sensor and the object of the image at the time of image capture, may include an object name, may include a view name, may include an object ID, may include a view ID, may include a unique identifier, may include a text string associated with the object of the image, may include a name of a computer file (such as a sound clip, a movie clip, or other media file) associated with the image, may include a price of the object of the image, may include the UPC associated with the object of the image, and may include a flag indicating that the object of the image is a relatively high security-risk item. The associated data may be manually entered, may be automatically generated or retrieved, or a combination of both. For example, in one embodiment, the operator of the system 100 may input all of the associated data manually. In another embodiment, one or more of the associated data items, such as the object ID or the view ID, may be generated automatically, such as sequentially, by the system. In another embodiment, one or more of the associated data items may be generated through another input method. For example, a UPC associated with an image may be inputted using a barcode scanner.

Several images may be taken at different angles or poses with respect to a specific item. Preferably, each face of an item that needs to be recognized should be captured. In one embodiment, all such faces of a given object may be associated with the same object ID, but associated with different view IDs.

Additionally, if an item that needs to be recognized is relatively malleable and/or deformable, such as a bag of pet food or a bag or charcoal briquettes, several images may be taken at different deformations of the item. It may be beneficial to capture a relatively high-resolution image, such as a close-up, of the most visually distinctive regions of the object, such as the product logo. It may also be beneficial to capture a relatively high-resolution image of the least malleable portions of the item. In one embodiment, all such deformations and close-ups captured of a given object may be associated with the same object ID, but associated with different view IDs. The process may advance from the state 504 to a state 506.

In the state 506, the process may store the image received in the state 502 and the associated data collected in the state 504. In one embodiment, the system 100 may store the image and the associated data in a database, which was described earlier in connection with FIGS. 2A-C. The process may advance to a decision block 508.

In the decision block 508, the process may determine whether or not there are additional images to capture. In one embodiment, the system 100 may ask user whether or not there are additional images to capture, and the user's response may determine the action taken by the process. In this embodiment, the query to the user may be displayed on a checkout subsystem and the user may respond via the input devices of the checkout subsystem. If there are additional images to capture, the process may return to the state 502 to receive an additional image. If there are no additional images to capture, the process may proceed to a state 510.

In the state 510, the process may perform a training subprocess on the captured image or images. In one embodiment, the process may scan the database that contains the images stored in the state 506, select images that have not been trained, and run the training subroutine on the untrained images. For each untrained image, the system 100 may analyze the image, find the features present in the image and save the features in the Object Database 222. The process may advance to an optional state 512.

In the optional state 512, the process may delete the images on which the system 100 was trained in the state 510. In one embodiment, the matching process described earlier in connection with FIG. 4 may use the features associated with a trained image and may not use the actual trained image. Advantageously, deleting the trained images may reduce the amount of disk space or memory required to store the Object Database. Then, the process may end and be repeated as desired.

In one embodiment, the system may be trained prior to its initial use, and additional training may be performed repeatedly. It will be understood that the number of training images acquired in different training cycles may vary in a wide range.

As described above, embodiments of the system and method may advantageously permit one or more visual sensors, such as one or more cameras, operatively coupled to a computer system to view and recognize items located on, for example, the lower shelf of a shopping cart in the checkout lane of a retail store environment. These techniques can advantageously be used for the purpose of reducing or preventing loss or fraud.

It should be understood, of course, that the foregoing relates to exemplary embodiments of the invention and that modifications may be made without departing from the spirit and scope of the invention as set forth in the following claims.

We claim:

1. A system for checking out merchandise, comprising:

at least one visual sensor for capturing an image of an object on a cart, wherein the at least one visual sensor is in a mounted position at a checkout counter and wherein the visual sensor has, from its mounted position, a field of view directed to a checkout lane to capture the image of the object when the cart is in the checkout lane; and a subsystem coupled to the at least one visual sensor, wherein the subsystem is configured to:

extract a plurality of visual features comprising feature descriptors from the image of the object on the cart;

compare each of the plurality of feature descriptors of the extracted visual features to a plurality of feature descriptors of visual features associated with a plurality of known objects, and identify a plurality of matching visual descriptors to find a match between the object on the cart and one of the plurality of known objects.

2. The system of claim 1, wherein the at least one visual sensor is a digital camera with a charge-coupled-device (CCD) imager, a complementary metal-oxide semiconductor (CMOS) imager, an infrared imager, or any combination thereof.

3. The system of claim 1, wherein the subsystem comprises:

a checkout subsystem configured to receive visual data from the at least one visual sensor, a server configured to receive visual data from the checkout subsystem, recognize the object, and send match data to the checkout subsystem; and an object database configured to store the plurality of visual features associated with the plurality of known objects.

4. The system of claim 3, wherein the object database is spread over a plurality of storage devices connected via a network.

5. The system of claim 3, wherein the checkout subsystem is coupled to one or more input devices, each of the one or more input devices including a barcode scanner, a scale, a keyboard, a keypad, a touch screen, a card reader or any combination thereof.

6. The system of claim 3, wherein the checkout subsystem comprises a checkout terminal used .by a cashier or a self-service checkout terminal.

7. The system of claim 1, wherein the plurality of extracted visual features and the plurality of visual features associated with the plurality of known objects are scale-invariant feature transform (SIFT) features.

8. The system of claim 1, wherein the cart comprises a shopping cart.

9. The system of claim 8, wherein the shopping cart comprises a bottom of basket, and wherein the at least one visual sensor comprises one or more cameras directed to the bottom of basket when the cart is in a checkout lane.

10. The system of claim 3, wherein the checkout subsystem is coupled at least one input device, wherein the input device is selected from the group consisting of: a barcode scanner, a scale, a keyboard, a keypad, a touch screen, a card reader or a combination thereof.

11. A system for checking out merchandise in a shopping cart, comprising:

at least one visual sensor for capturing an image of the merchandise in the shopping cart, wherein the at least one visual sensor is in a mounted position at a checkout counter and wherein the visual sensor has, from its mounted position, a field of view directed to a checkout lane to capture the image of the merchandise when the shopping cart is in the checkout lane;

a checkout subsystem adapted to receive visual data from the at least one visual sensor; and a server adapted to:

receive the visual data from the checkout subsystem, extract a plurality of visual features comprising feature descriptors from the image of the merchandise in the shopping cart, recognize the merchandise based on comparing the feature descriptors of the extracted visual features to feature descriptors of visual features associated with known objects to find a match between the merchandise in the shopping cart and one of the known objects.

12. A non-transitory computer readable medium in a merchandise checkout system embodying program code with instructions for recognizing an object, the merchandise checkout system including at least one visual sensor, said non-transitory computer readable medium comprising:

program code for receiving visual image data of an object on a cart, the visual image data comprising one or more visual features of the object, wherein the at least one visual sensor is in a mounted position at a checkout counter and wherein the visual sensor has, from its mounted position, a field of view directed to a checkout lane to capture an image of the object when the cart is in the checkout lane;

program code for comparing the visual features of the object with visual features of a plurality of known objects to find a set of matches;

program code for identifying the object on the cart as one of the plurality of known object based on the set of matches; and program code for sending a recognition alert to a checkout terminal.

13. A system for checking out merchandise, comprising:

at least one visual sensor for capturing an image of one or more objects on a cart, wherein the at least one visual sensor is in a mounted position at a checkout counter and wherein the visual sensor has, from its mounted position, a field of view directed to a checkout lane to capture the image of the object(s) when the cart is in the checkout lane; and a subsystem coupled to the at least one visual sensor and configured to detect and recognize the object from a plurality of known objects by analyzing the image of the one or more objects on the cart using a scale-invariant feature transform (SIFT) to extract visual features from the image of the one or more objects on the cart.

14. A method for checking out merchandise, the method comprising:

capturing an image of one or more objects on a shopping cart, wherein the image is captured from a visual sensor in a mounted position in proximity to a checkout counter and wherein the visual sensor has, from its mounted position, a field of view directed to a checkout lane to capture the image of the object(s) when the shopping cart is in the checkout lane;

extracting a plurality of features comprising scale-invariant feature descriptors from the image of the objects on the shopping cart; and comparing the plurality of scale-invariant feature descriptors to a plurality of known features comprising scale-invariant feature descriptors associated with a plurality of known objects;

identifying one or more matches between the plurality of scale-invariant feature descriptors and the plurality of known scale-invariant feature descriptors; and identifying each of the one or more objects on the shopping cart based on the one or more matches.

15. The method of claim 14, wherein the each of the plurality of extracted scale-invariant features is a scale-invariant feature transform (SIFT) feature.

* * * * *